United States Patent [19]

Bruneel

[11] 4,377,253
[45] Mar. 22, 1983

[54] COUPLING ASSEMBLY PARTICULARLY FOR CENTRIFUGES

[75] Inventor: Robert Bruneel, Overijse, Belgium

[73] Assignee: Syglo International S.A., Luxembourg

[21] Appl. No.: 222,049

[22] Filed: Jan. 2, 1981

[30] Foreign Application Priority Data

Feb. 12, 1980 [LU] Luxembourg .............................. 82161

[51] Int. Cl.³ .............................................. B04B 11/00
[52] U.S. Cl. ..................................... 494/38; 285/134; 285/137 R; 422/101; 494/14; 494/43
[58] Field of Search ........... 233/1 R, 1 A, 1 D, 14 R, 233/14 A, 26, 25, 27, 17, 16, 21, 22; 285/133, 134, 137 R, 142, 143, 185, 190

[56] References Cited

U.S. PATENT DOCUMENTS

| | | | |
|---|---|---|---|
| 3,255,805 | 6/1966 | Bechard | 233/11 |
| 3,640,452 | 2/1972 | Thylefors | 233/1 A |
| 3,675,846 | 7/1972 | Drucker | 233/26 |
| 3,927,826 | 12/1975 | Anderson | 233/11 |
| 4,091,989 | 5/1978 | Schultz | 233/14 R |
| 4,098,455 | 7/1978 | Ammann | 233/26 |

Primary Examiner—Robert W. Jenkins
Attorney, Agent, or Firm—Lerner, David, Littenberg & Samuel

[57] ABSTRACT

A coupling assembly for centrifuges is described comprising a rotatable part and a fixed part, a plurality of tubular conduits provided in the fixed part and a corresponding multiplicity of feed and/or discharge passages in the rotatable part, each communicating at one end with one of the tubular conduits and at the other end with the interior of the centrifuging device. The passages are defined in the lateral portion of respective cup-like elements arranged along the axis of the fixed part in fluid-tight connection with each other and with the fixed part.

6 Claims, 4 Drawing Figures

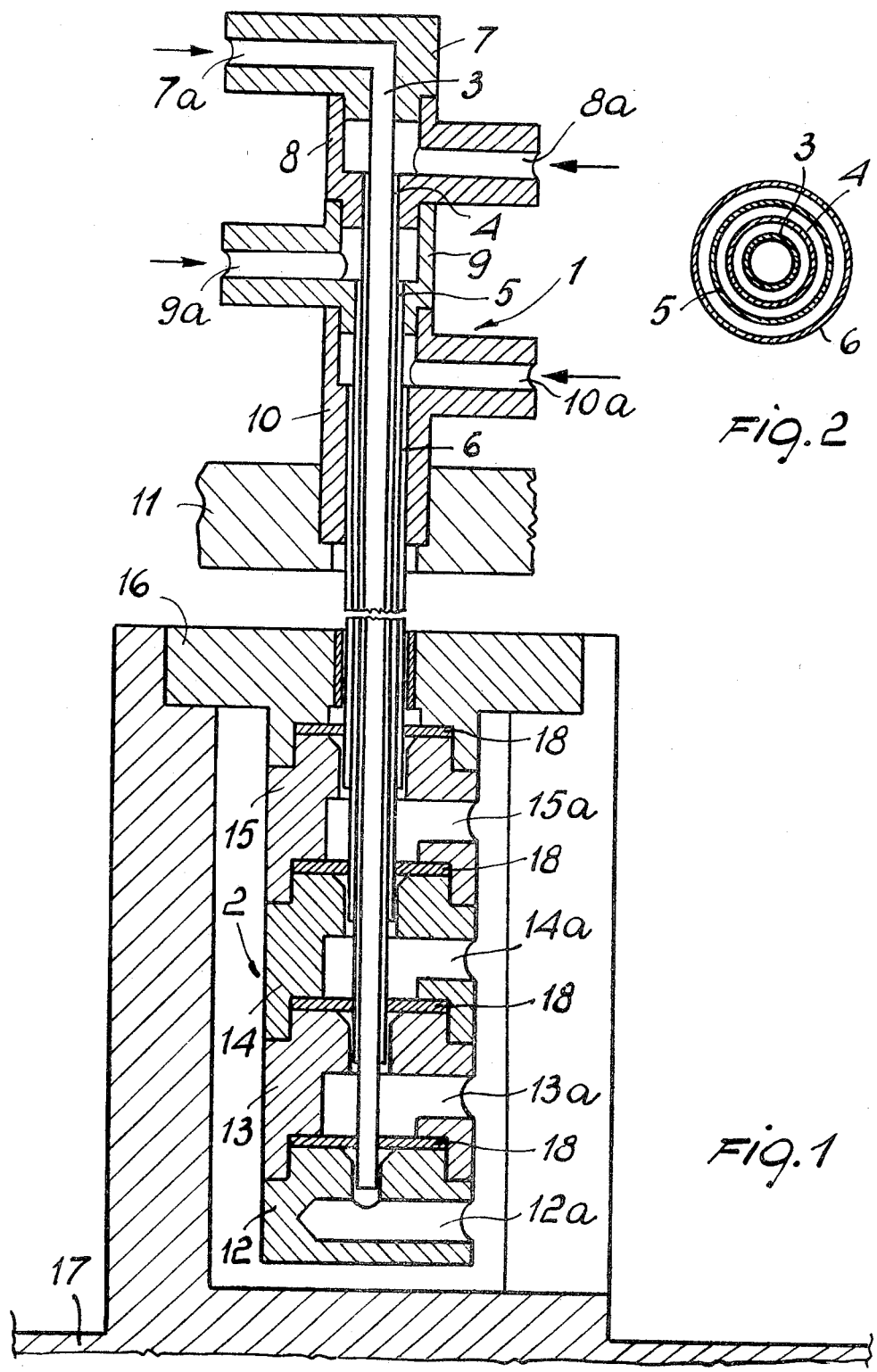

COUPLING ASSEMBLY PARTICULARLY FOR CENTRIFUGES

BACKGROUND OF THE INVENTION

This invention relates to a coupling assembly suitable in particular for rotary devices, for example centrifuges.

In rotary devices, for example centrifuges or the like into which fluids to be processed are fed and from which various components separated from the processed fluid leave, it is known to use couplings for connecting fluid feed and/or discharge conduits to the centrifuge interior, said couplings having a fixed portion and another portion which rotates together with the centrifuging device. In general, in such devices, the fluid feed and discharge conduits are fixed and are disposed in the fixed portion of said couplings, and in such a case the operation of the respective centrifuging cells is generally intermittent to allow for the feed and discharge of the products separated in the centrifuge in a given sequence.

There are also centrifuging devices comprising feed or discharge conduits of special construction which are arranged to at least partly rotate together with the centrifuging cell. These types of centrifuge are also able to operate continuously, but this implies a certain traversing movement of the discharge conduits during the centrifuging cycle to enable them to be positioned in the various zones in the centrifuge from which the separated components of the processed fluids are discharged at any given time. Consequently, in such types of centrifuge, some of the feed and/or discharge conduits are disposed in an eccentric position with respect to the axis of rotation of the centrifuge, and this can give rise to contamination problems for the processed liquids as they are transferred into these eccentric conduits.

SUMMARY OF THE INVENTION

The main object of the present invention is to obviate the drawbacks of known couplings used in devices of the centrifuge type, by providing a rotary coupling able to allow continuous operation of said devices without having to subject the discharge and/or feed conduits to additional traversing movements.

A further object of the present invention is to provide a coupling of the aforesaid type comprising all the feed and discharge conduits positioned concentrically to the axis of rotation of the rotary devices to which they are fitted.

A further object of the present invention is to provide a coupling which enables the processed liquids to be fed and discharged simultaneously instead of in sequence, thus enabling the processing times in said devices to be shortened.

A further object is to provide a type of coupling which ensures perfect separation of the respective components of the processed liquids.

These and further objects which will be more apparent hereinafter are attained, according to the invention, by a coupling in particular for centrifuging devices, characterized in that it comprises a rotatable part and a fixed part disposed along the axis of rotation of said rotatable part, a plurality of tubular conduits provided in said fixed part and a corresponding multiplicity of feed and/or discharge passages in said rotatable part, each in permanent communication at one end with one of said tubular conduits and at the other end with the interior of said centrifuging device.

BRIEF DESCRIPTION OF THE DRAWINGS

Further characteristics and advantages of the invention will be more apparent from the description of preferred but not exclusive embodiments of the coupling according to the invention, illustrated by way of non-limiting example in the accompanying drawings, in which:

FIG. 1 is a longitudinal diagrammatic section through a first embodiment of the coupling according to the invention;

FIG. 2 is a cross-section through the tubular conduits of the coupling of FIG. 1 to an enlarged scale;

DESCRIPTION OF THE PREFERRED EMBODIMENTS

Figures 3, 4:
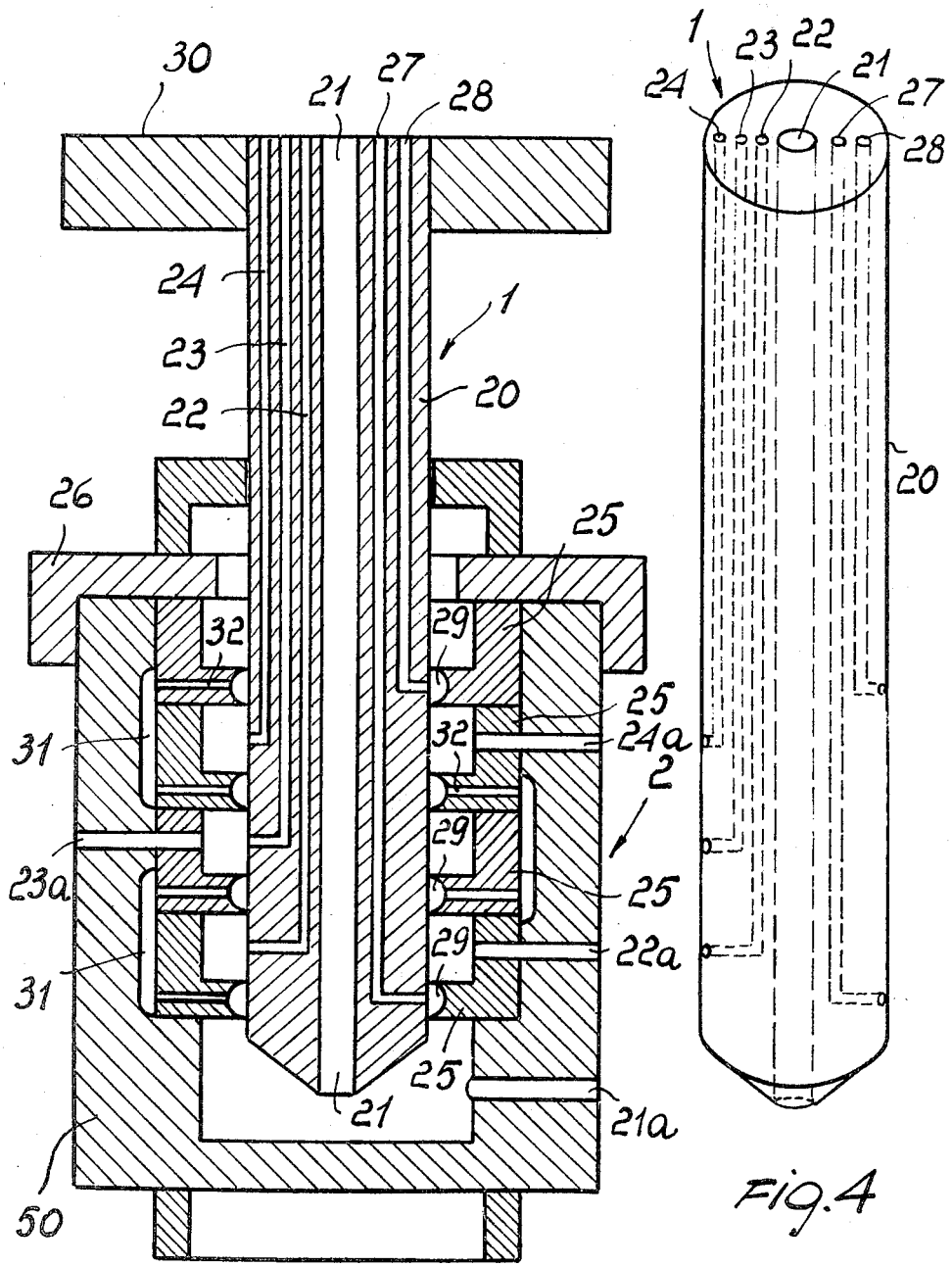
FIG. 3 is a longitudinal section through a further embodiment of the coupling according to the invention.
FIG. 4 is a perspective diagrammatic view of the fixed part of the coupling of FIG. 3.

With reference to the aforesaid drawings, the coupling according to the invention comprises a fixed part indicated overall by 1 and a rotatable part indicated overall by 2. In the embodiment of the coupling illustrated in FIGS. 1 and 2, the fixed part 1 thereof comprises a plurality of conduits in form of coaxial tubes 3, 4, 5 and 6 respectively, of such a length that each interior tube has its respective end portions projecting relative to the adjacent surrounding tube.

The fixed part 1 of the coupling also comprises a plurality of mutually engaged cylindrical bosses acting as a support for each of said concentric tubes 3 to 6. For this purpose, each of the upper end portions of the tubes 3 to 6, which as stated project relative to the surrounding adjacent tube on the exterior of the rotatable part 1, is fixed to a respective boss 7, 8, 9 and 10, by means of any suitable system, for example by cementing. The bosses 7 to 10 are fixed together either by means of recessed joints or by cementing, and each comprises a lateral appendix containing radial passages 7a, 8a, 9a and 10a which are in communication with the respective open upper ends of the tubes 3, 4, 5 and 6 through respective inner chambers of the bosses.

The fixed part 1 of the coupling is centered and fixed in a centering and fixing bush 11, which is only partly shown. The tubes 3 to 6 can be constructed of rigid material, for example metal, or can be in the form of flexible tubes.

As clearly visible in FIG. 1, the rotatable part 2 of the coupling comprises a plurality of mutually engaged cup-like elements 12, 13, 14 and 15 which are fixed together by recessed joints, by cementing or by any other suitable system, and can be fixed by means of a collar 16 to the rotating plate 17 of a rotating device, for example a centrifuge.

In this manner, the cup-like elements 12 to 16 form a single body which is arranged coaxially with the fixed part 1 and can be rotated by the rotating plate 17.

The rotatable portion 2 comprising said cup-like elements of the coupling according to the invention surrounds the lower or inner end portions of the tubes 3 to 6, and each of the cup-like elements 12 to 15 comprises in a lateral portion thereof a radial passage 12a, 13a, 14a and 15a respectively, which is in communication with the open lower end of the respective tube 3, 4, 5 or 6. In fact, as clearly visible in FIG. 1, each of the passages 12a, 13a, 14a and 15a opens into a respective annular chamber defined in each of the cup-like elements 12, 13, 14 and 15 around the fixed part 1, the annular chamber communicating with the lower end of a respective tube 3, 4, 5, 6 which ends within an axial bore of the respective cup-like element 12, 13, 14 and 15.

In this manner, a plurality of paths are defined in the coupling according to the invention, each constituted by one of the passages 7a, 8a, 9a and 10a in the fixed part of the coupling, one of the tubular conduits defined by the tubes 3, 4, 5 and 6, and one of the corresponding passages 12a, 13a, 14a and 15a in the rotatable part of the coupling. These paths can be used either as feed or discharge paths for the processed liquid and for the components separated by centrifuging this liquid.

Ring seal gaskets 18 are disposed between the cup-like elements 12 to 16 and engage the respective projecting inner end portions of each of the tubes 3 to 6, in order to define fluid-tight connection between the cup-like elements and the fixed part 1 and to separate said paths formed as stated heretofore from each other. As visible in FIG. 1, the cup-like elements 12, 13, 14 and 15 have each an annular ridge for receiving an annular recess in the adjacent cup-like element, while the ring seal gaskets 18 are arranged within the respective ridges.

The various passages 7a to 10a in the fixed part of the coupling are suitably connected to one or more feed sources and/or vessels for collecting separated components, while the passages 12a to 15a of the rotating part of the coupling are connected, for example by flexible hoses, to the inner zones of the centrifuge to which liquids for processing are to be fed or from which the separated components of these liquids are to be discharged.

With reference to the embodiment of the coupling according to the invention shown in FIGS. 3 and 4, the fixed part 1 is constituted by a substantially cylindrical member 20, for example a metal cylinder, in which tubular conduits 21, 22, 23 and 24 are provided at and around the centre respectively.

The cylinder 20 can for example be fixed into a centering and fixing bush 30.

The rotatable part 2 of the coupling is formed from a hollow cylindrical body 50 which can be adapted to the rotating plate of a centrifuge and comprises in its lateral walls a number of passages corresponding to the number of tubular conduits, this number being four in the embodiment illustrated. These passages, indicated respectively by 21a, 22a, 23a and 24a, are in communication with the respective conduits 21, 22, 23 and 24 by way of annular collecting chambers defined about the cylinder 20 by cup-like elements in form of ring seal gasket member 25 with raised edges. The seal provided by the gaskets is suitably ensured by means of a gasket compressing cover 26. In this embodiment, the tubular conduits provided in the fixed part 1 and the passages provided in the rotatable part 2 of the coupling and communicating with said tubular conduits also define paths which, according to requirements, can either be used as feed or discharge paths for processed liquids or for their components separated in the centrifuge respectively. During operation, the upper ends of the tubular conduits 21 to 24 are again in this case connected to feed sources and/or collection vessels for the separated components, while the passages 21a to 24a are connected for example by suitable flexible hoses to the inner zones of the centrifuge to which the liquid to be processed is to be fed or from which the respective separated components are to be drawn up and discharged.

Advantageously, as shown in FIG. 3, the coupling can also comprise a cooling jacket and feed and discharge paths to and from this for a cooling liquid, such as a physiological brine solution, to prevent heating of the coupling and consequent deterioration of the processed liquids or the components separated therefrom. For this purpose, two further conduits 27 and 28 are provided in the cylinder 20 for respectively feeding and discharging the cooling liquid to and from annular spaces 29 defined about the fixed part 1 of the coupling in the gaskets 25 and communicating with each other by way of channels 32 provided in said gaskets, and recesses 31 each defined between two respective adjacent gaskets in the inner surface of the cylindrical body 50 of the coupling.

The operation of the coupling according to the invention is clear from the aforegoing description. It can be advantageously used for example in centrifuging sensitive liquids such as liquids for pharmacological use, and in particular blood, in which case the blood is fed through one of the paths defined by the respective tubular conduits and passages in the rotatable part of the coupling, and the components of the blood such as white corpuscles or platelets, plasma and red corpuscles are discharged through the remaining paths. The presence of the plurality of paths in the coupling according to the invention allows simultaneous feed and discharge of all separated components, and thus a considerably increased speed of processing. In addition, it ensures perfect separation of the isolated components by preventing any mixing thereof, which can occur in devices of the known art in which a single discharge tube is displaced so that it dips into different points of the centrifuge.

From the aforegoing, it is apparent that modifications can be made to the coupling according to the invention within the scope of the inventive idea as heretofore described and claimed hereinafter.

I claim:

1. A coupling assembly for a centrifuging device, comprising a fixed part and a rotatable part partially surrounding said fixed part for rotation about an axis of said fixed part, a plurality of conduits in said fixed part each having one end on the exterior of said rotatable part and another end in the interior of said rotatable part, a plurality of conduits in said rotatable part each having one end communicating with a corresponding one of said conduits in said fixed part and another end communicating with the interior of said centrifuging device, wherein said rotatable part comprises a plurality of mutually engaged cup-like elements arranged along said axis coaxially with said fixed part and in fluid-tight connection with each other and with said fixed part, said cup-like elements each having a lateral portion having a radial passage therein defining at least part of a corresponding one of said conduits in said rotatable part, said cup-like elements defining a chamber around said fixed part communicating with a respective one of said radial passages and said conduits in said fixed part.

2. A coupling assembly as claimed in claim 1, wherein said conduits in said fixed part comprise coaxial tubes and said cup-like elements have axial bores for receiving said tubes, each of said tubes ending within a respective one of said axial bores.

3. A coupling assembly as claimed in claim 2, wherein said cup-like elements have each an annular ridge for receiving an annular recess in the adjacent of said cup-like elements, and wherein ring seal gaskets are arranged between said cup-like elements within said ridges.

4. A coupling assembly as claimed in claim 1, wherein said conduits in said fixed part comprise tubular conduits and wherein said fixed part further comprises a plurality of mutually engaged cylindrical bosses arranged along said axis and each having an inner chamber communicating with a respective one of said tubular conduits and a radial passage communicating with said inner chamber.

5. A coupling assembly as claimed in claim 1, wherein said cup-like elements comprise gasket members each having a base portion defining an annular space around said fixed part, said annular spaces communicating with each other and with a supply and discharge conduit in said fixed part.

6. A coupling assembly as claimed in claim 5, further comprising a hollow cylindrical body housing said gasket members, said body having recesses in an inner surface thereof for providing fluid communication between said annular spaces of respective adjacent gasket members.

* * * * *